(12) United States Patent
Lee et al.

(10) Patent No.: US 9,529,235 B2
(45) Date of Patent: Dec. 27, 2016

(54) LIQUID CRYSTAL DISPLAY

(71) Applicant: Samsung Display Co., Ltd., Yongin, Gyeonggi-Do (KR)

(72) Inventors: Sun Hwa Lee, Yongin-si (KR); Kwang-Chul Jung, Seongnam-si (KR); Mee Hye Jung, Suwon-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 14/737,313

(22) Filed: Jun. 11, 2015

(65) Prior Publication Data

US 2016/0209712 A1 Jul. 21, 2016

(30) Foreign Application Priority Data

Jan. 20, 2015 (KR) .................. 10-2015-0009497

(51) Int. Cl.
*G02F 1/1343* (2006.01)
*G02F 1/1368* (2006.01)
*G02F 1/1362* (2006.01)
*G02F 1/1333* (2006.01)

(52) U.S. Cl.
CPC ....... *G02F 1/134309* (2013.01); *G02F 1/1368* (2013.01); *G02F 1/133305* (2013.01); *G02F 1/136286* (2013.01); *G02F 2001/134345* (2013.01)

(58) Field of Classification Search
CPC .............. G02F 1/134309; G02F 2001/133742; G02F 2001/134345; G02F 2001/134354; G02F 2001/1357
See application file for complete search history.

(56) References Cited

U.S. PATENT DOCUMENTS

| 2009/0244425 | A1* | 10/2009 | Jung ................. G02F 1/133753 349/48 |
| 2010/0245751 | A1* | 9/2010 | Muneyoshi ....... G02F 1/133305 349/149 |
| 2011/0304789 | A1* | 12/2011 | Jung ................... G02F 1/13624 349/38 |
| 2012/0224128 | A1* | 9/2012 | Jung ................ G02F 1/134309 349/129 |
| 2015/0036073 | A1 | 2/2015 | Im et al. |
| 2015/0042939 | A1 | 2/2015 | Park et al. |

FOREIGN PATENT DOCUMENTS

| KR | 10-2013-0034360 A | 4/2013 |
| KR | 10-2013-0125638 A | 11/2013 |
| KR | 10-2014-0004040 A | 1/2014 |
| KR | 10-2014-0021105 A | 2/2014 |

* cited by examiner

Primary Examiner — Thanh-Nhan P Nguyen
(74) Attorney, Agent, or Firm — Innovation Counsel LLP

(57) ABSTRACT

A liquid crystal display for improving transmittance includes: a first substrate; and a pixel electrode provided on the first substrate and including a first sub-pixel electrode and second sub-pixel electrode configured to receive different voltages, wherein the first sub-pixel electrode includes a T-shaped stem including a first horizontal stem and a first vertical stem and a first fine branch extending from the T-shaped stem, and the second sub-pixel electrode includes a cross-shaped stem including a second horizontal stem and a second vertical stem and a second fine branch extending from the cross-shaped stem.

17 Claims, 5 Drawing Sheets

LIQUID CRYSTAL DISPLAY

CROSS-REFERENCE TO RELATED APPLICATION

This application claims priority to and the benefit of Korean Patent Application No. 10-2015-0009497 filed in the Korean Intellectual Property Office on Jan. 20, 2015, the entire contents of which are incorporated herein by reference.

BACKGROUND (a) Technical Field

The present disclosure relates to a liquid crystal display. More particularly, the present disclosure relates to a liquid crystal display for improving transmittance.

(b) Description of the Related Art

A liquid crystal display is a flat panel display that is widely used at present and generally includes two display panels on which electric field generating electrodes, such as a pixel electrode and a common electrode, are formed, and a liquid crystal layer inserted therebetween. The liquid crystal display displays an image by applying a voltage to the electric field generating electrodes to generate an electric field in the liquid crystal layer. By controlling the strength of the electric field being generated, the liquid crystal display is able to control the alignment of the liquid crystal molecules in the liquid crystal layer and thereby control the polarization of incident light transmitted by the liquid crystal layer.

The two sheets of display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

Recently, the liquid crystal displays have been becoming wider, and curved display devices are being developed to enhance immersion of viewers.

The curved liquid crystal displays may be realized by forming components on two display panels, attaching the display panels together to form a flat-panel liquid crystal display, and then bending it. In such case, however, the two display panels may be misaligned from each other, thereby generating texture and reducing transmittance of the display.

The above information disclosed in this Background section is only for enhancement of understanding of the background of the disclosure and therefore may contain information that does not form the prior art that is already known in this country to a person of ordinary skill in the art.

SUMMARY

The present disclosure provides a liquid crystal display having improved transmittance.

An exemplary embodiment of the present system and method provides a liquid crystal display including: a first substrate; and a pixel electrode provided on the first substrate and including a first sub-pixel electrode and a second sub-pixel electrode configured to receive different voltages, wherein the first sub-pixel electrode includes a T-shaped stem including a first horizontal stem and a first vertical stem, and a first fine branch extending from the T-shaped stem, and the second sub-pixel electrode includes a cross-shaped stem including a second horizontal stem and a second vertical stem, and a second fine branch extending from the cross-shaped stem.

The first sub-pixel electrode may be configured to receive a first data voltage, and the second sub-pixel electrode is configured to receive a second data voltage smaller than the first data voltage.

The first vertical stem may be connected to a first end of the first horizontal stem.

The first sub-pixel electrode may include two first horizontal stems and two first vertical stems.

One of the two first horizontal stems and one of the two first vertical stems may be provided on an upper portion of the first sub-pixel electrode, and the other of the two first horizontal stems and the other of the two first vertical stems may be provided on a lower portion of the first sub-pixel electrode.

One of the two first vertical stems may be provided on a first edge of the first sub-pixel electrode, and the other of the two first vertical stems may be provided on a second edge of the first sub-pixel electrode.

One of the two first vertical stems may be provided on a left edge of the first sub-pixel electrode, and the other of the two first vertical stems may be provided on a right edge of the first sub-pixel electrode.

The first sub-pixel electrode may include a plurality of first fine branches, and the plurality of first fine branches may extend in four different directions from the T-shaped stem.

The plurality of first fine branches may extend in a top right direction, a bottom right direction, a top left direction, and a bottom left direction from the T-shaped stem.

The second vertical stem may cross the second horizontal stem.

The second vertical stem may cross a center portion of the second horizontal stem.

The second horizontal stem may cross the second vertical stem on a center portion of the second sub-pixel electrode.

The second sub-pixel electrode may include a plurality of second fine branches, and the plurality of second fine branches may extend in four different directions from the cross-shaped stem.

The plurality of second fine branches may extend in a top left direction, a top right direction, a bottom right direction, and a bottom left direction from the cross-shaped stem.

The liquid crystal display may further include: a gate line, a data line, and a reference voltage line provided on the first substrate; a first thin film transistor and a second thin film transistor connected to the gate line and the data line; and a third thin film transistor connected to the gate line, the reference voltage line, and the second thin film transistor.

The first substrate may be made of a bendable material.

The liquid crystal display according to an exemplary embodiment of the present system and method improves transmittance by having different configurations of two sub-pixel electrodes configuring one pixel electrode.

DETAILED DESCRIPTION OF THE EMBODIMENTS

Figure 1:
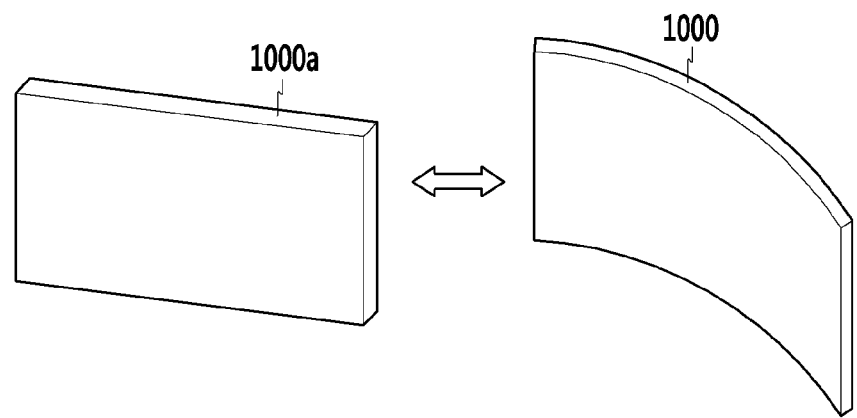
FIG. 1 shows a perspective view of a liquid crystal display according to an exemplary embodiment of the present system and method.

The present system and method are described more fully hereinafter with reference to the accompanying drawings in which exemplary embodiments of the system and method are shown. As those skilled in the art would realize, the described embodiments may be modified in various different ways, all without departing from the spirit or scope of the present system and method.

In the drawings, the thickness of layers, films, panels, regions, etc., is exaggerated for clarity. Like reference numerals designate like elements throughout the specification. When an element, such as a layer, film, region, or substrate, is referred to as being "on" another element, it may be directly on the other element, or intervening elements may also be present. In contrast, when an element is referred to as being "directly on" another element, there are no intervening elements present.

A liquid crystal display according to an exemplary embodiment of the present system and method is described below with reference to FIG. 1.

FIG. 1 shows a perspective view of a liquid crystal display an exemplary embodiment of the present system and method.

As shown in FIG. 1, the liquid crystal display may be used for a flat liquid crystal display 1000a or a curved liquid crystal display 1000 that is bent with a predetermined curvature. That is, the liquid crystal display is usable for the flat liquid crystal display 1000a and the curved liquid crystal display 1000.

Regarding the flat liquid crystal display 1000a, the distance from the viewer's eye to a plurality of pixels included in the display device varies. For example, the distance from a viewer's eye to pixels on the left and right edges of the display device 1000a may be longer than the distance from the viewer's eye to pixels at the center of the display device 1000a. On the contrary, in the curved liquid crystal display 1000 according to an exemplary embodiment of the present system and method, the distance from the viewer's eye to a plurality of pixels in the display 1000 is nearly constant, provided that the viewer's eye is positioned at the center of a circle formed by extending the curve. Since such a curved liquid crystal display provides a wider viewing angle than flat-panel display devices, photoreceptor cells in the viewer's eye are stimulated by more information and send more visual information to the brain via the optic nerves. As such, the sense of reality and immersion is heightened.

A pixel of a liquid crystal display according to an exemplary embodiment of the present system and method is described below with reference to FIG. 2 to FIG. 6.

Figure 2:
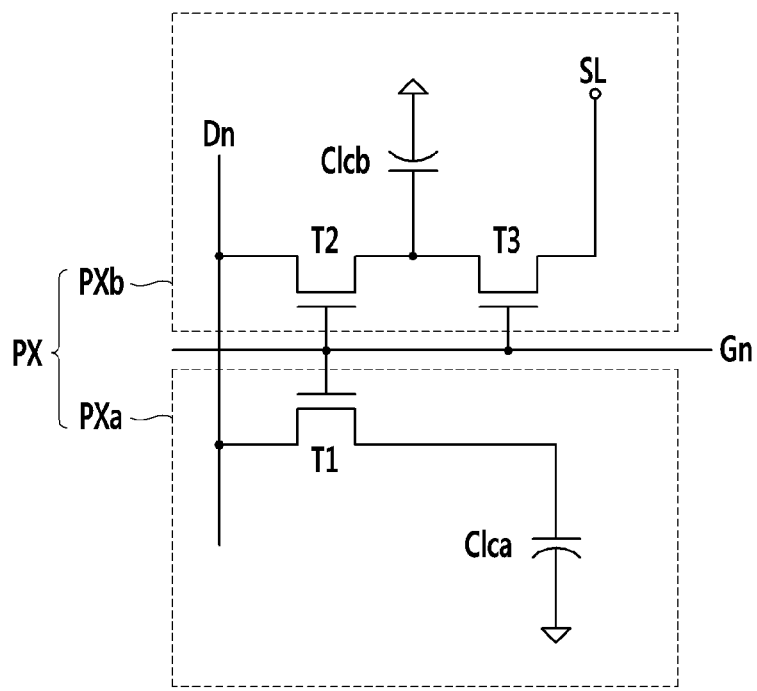
FIG. 2 shows an equivalent circuit diagram of a pixel of a liquid crystal display according to an exemplary embodiment of the present system and method.
Figure 3:
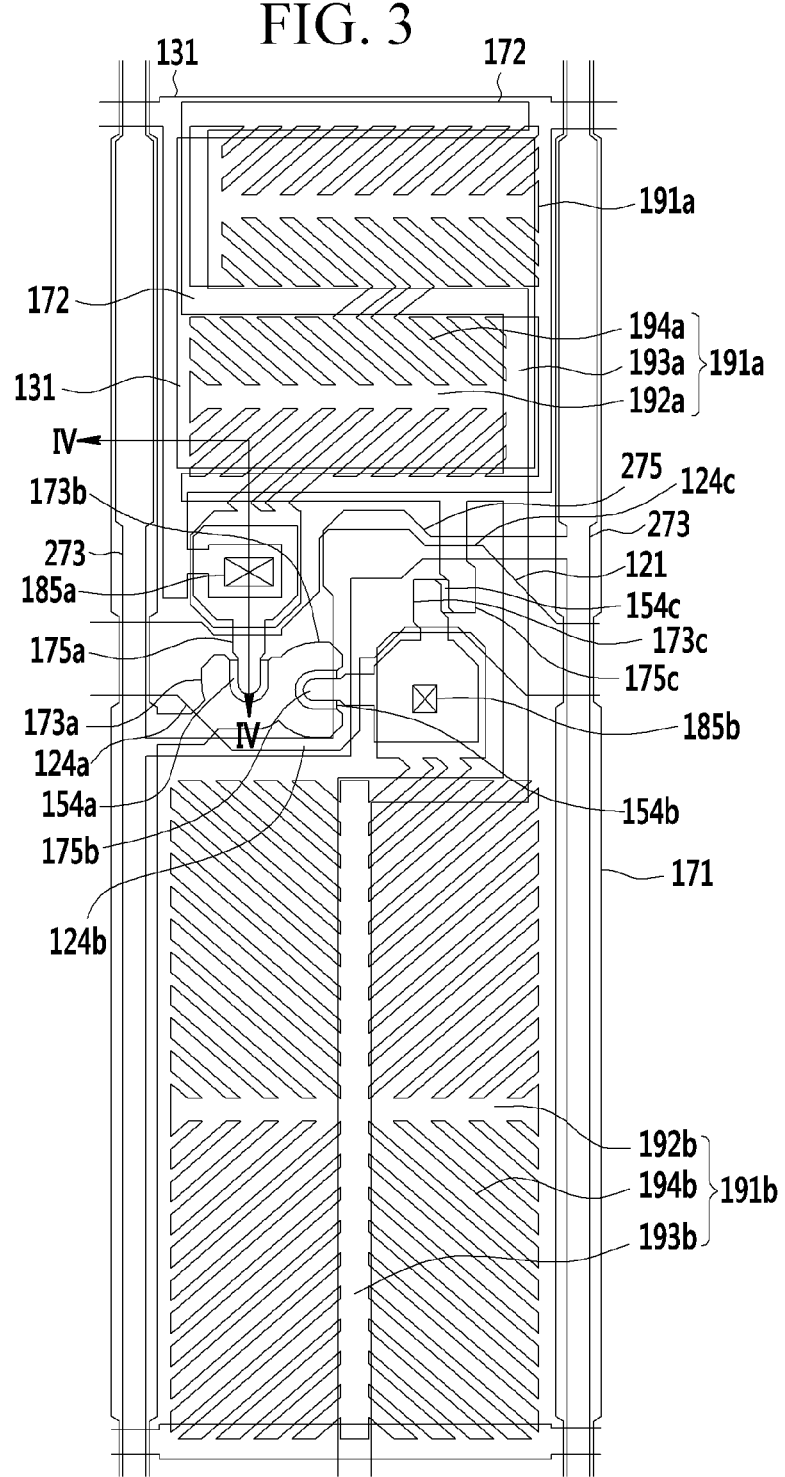
FIG. 3 shows a top plan view of a liquid crystal display according to an exemplary embodiment of the present system and method.
Figure 4:
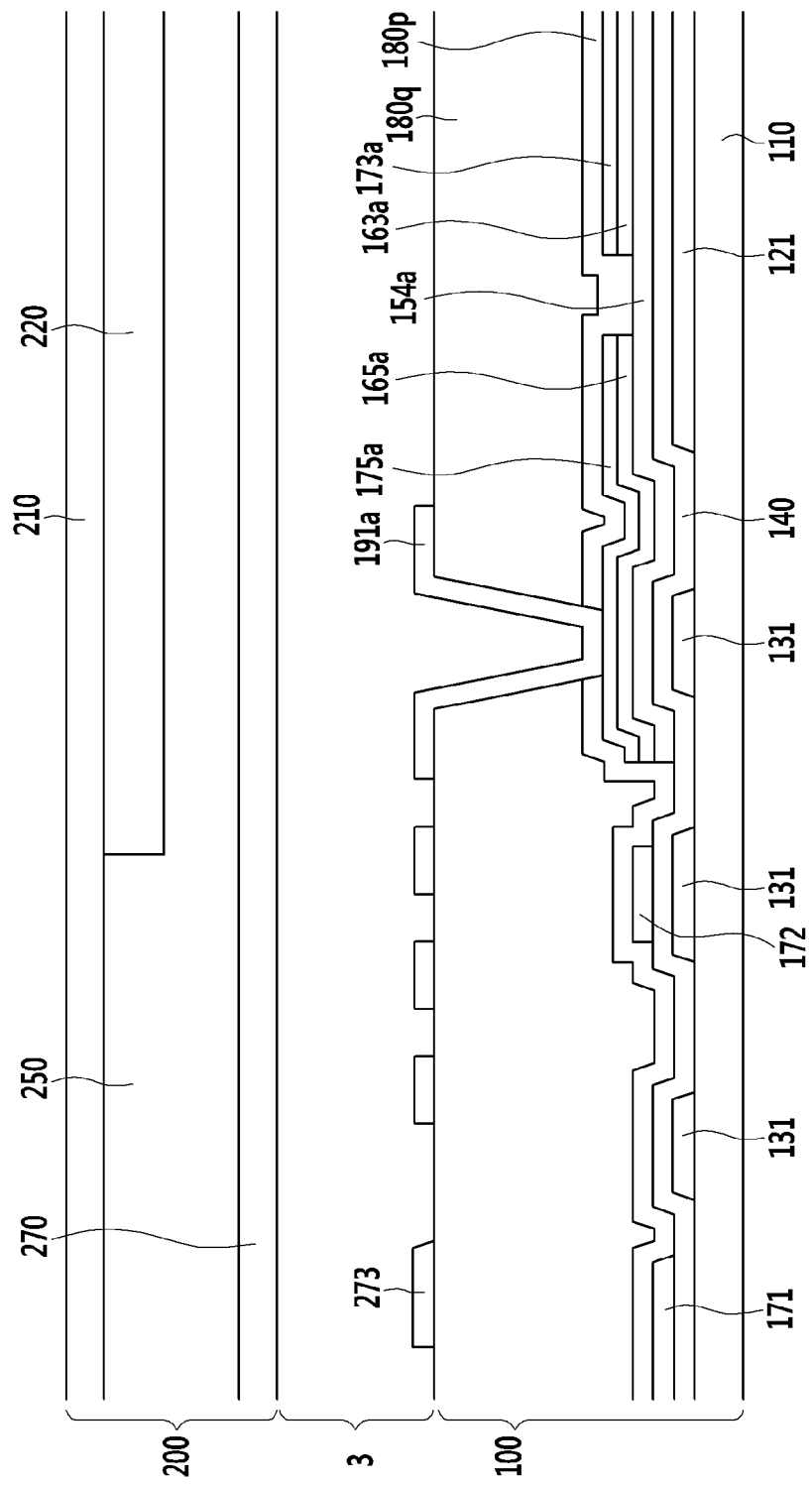
FIG. 4 shows a cross-sectional view of a liquid crystal display with respect to a line IV-IV of FIG. 3 according to an exemplary embodiment of the present system and method.
Figure 5:
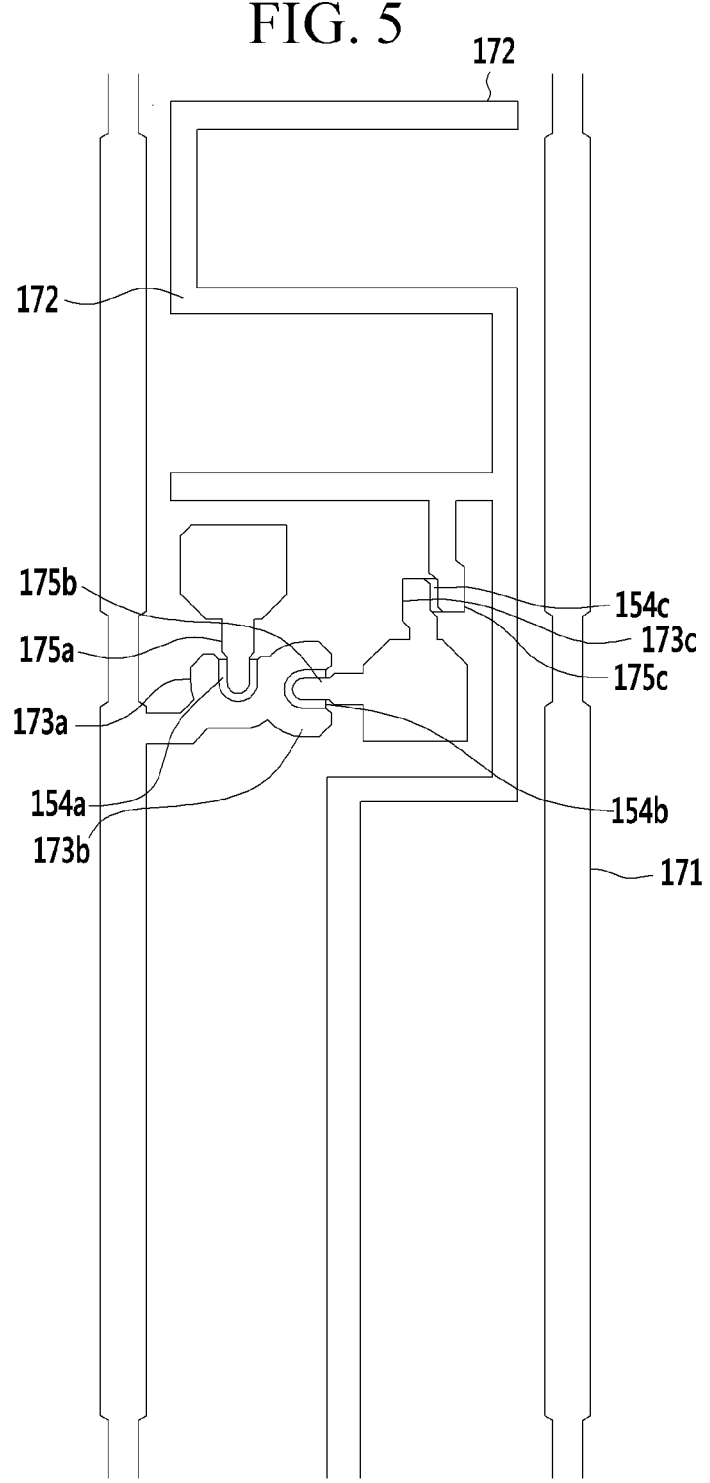
FIG. 5 and FIG. 6 show top plan views of a liquid crystal display according to an exemplary embodiment of the present system and method.
Figure 6:
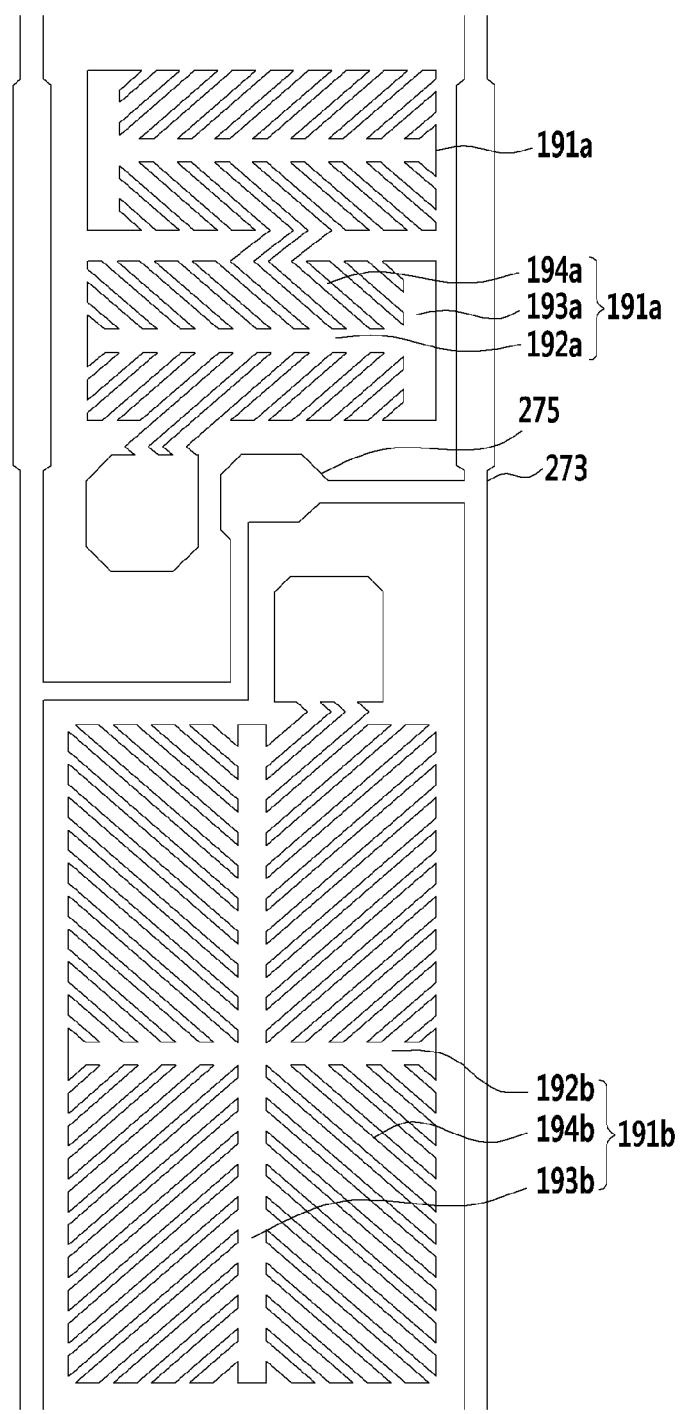

FIG. 2 shows an equivalent circuit diagram of a pixel of a liquid crystal display according to an exemplary embodiment of the present system and method. FIG. 3 shows a top plan view of a liquid crystal display according to an exemplary embodiment of the present system and method. FIG. 4 shows a cross-sectional view of a liquid crystal display with respect to a line IV-IV of FIG. 3 according to an exemplary embodiment of the present system and method. FIG. 5 and FIG. 6 show top plan views of a liquid crystal display according to an exemplary embodiment of the present system and method. FIG. 5 shows data lines and constituent elements provided on a first layer, and FIG. 6 shows pixel electrodes and constituent elements provided on a second layer.

Referring to FIG. 2, the liquid crystal display includes a plurality of signal lines Gn, Dn, and SL, and a plurality of pixels PX connected thereto.

The signal lines Gn, Dn, and SL include a gate line Gn for transmitting a gate signal (also called a scanning signal), a data line Dn for transmitting a data voltage, and a reference voltage line SL for receiving a predetermined voltage.

A first thin film transistor T1 and a second thin film transistor T2 that are connected to the same gate line Gn and the same data line Dn are formed. Further, a third thin film transistor T3 is formed so as to be connected to the same gate line Gn as that of the transistors T1 and T2 and to be connected to the second thin film transistor T2 and the reference voltage line SL.

Each pixel PX includes two subpixels PXa and PXb. A first liquid crystal capacitor Clca that is connected to the first thin film transistor T1 is formed in the first subpixel PXa. Further, a second liquid crystal capacitor Clcb that is connected to the second thin film transistor T2 is formed in the second subpixel PXb.

A first terminal of the first thin film transistor T1 is connected to the gate line Gn, a second terminal thereof is connected to the data line Dn, and a third terminal thereof is connected to the first liquid crystal capacitor Clca. A first terminal of the second thin film transistor T2 is connected to the gate line Gn, a second terminal thereof is connected to the data line Dn, and a third terminal thereof is connected to the second liquid crystal capacitor Clcb. A first terminal of the first thin film transistor T3 is connected to the gate line Gn, a second terminal thereof is connected to the third terminal of the second thin film transistor T2, and a third terminal thereof is connected to the reference voltage line SL.

Regarding an operation of the liquid crystal display according to an exemplary embodiment of the present system and method, when a gate-on voltage is applied to the gate line (Gn), the first, second, and third thin film transistors T1, T2, and T3 connected thereto are turned on, and the first liquid crystal capacitor (Clca) and the second liquid crystal capacitor (Clcb) are charged by the data voltage transmitted through the data line Dn.

In this instance, the third thin film transistor T3 is turned on, and part of the voltage charged in the second liquid crystal capacitor (Clcb) is output to the reference voltage line SL. Accordingly, even though the data voltages that are transmitted to the first subpixel PXa and the second subpixel PXb through the data line Dn are equal to each other, the voltages that are charged in the first liquid crystal capacitor Clca and the second liquid crystal capacitor Clcb are different from each other. That is, the voltage that is charged in the second liquid crystal capacitor Clcb is lower than the voltage that is charged in the first liquid crystal capacitor Clca.

By charging different subpixels PXa and PXb in the same pixel PX with different voltages, the side visibility of the liquid crystal display may be improved.

Referring to FIG. 3 to FIG. 6, the liquid crystal display includes a lower panel 100 and an upper panel 200 facing each other, and a liquid crystal layer 3 provided between the display panels 100 and 200.

The lower panel 100 is described below.

A gate metal layer including a gate line 121, a first gate electrode 124a, a second gate electrode 124b, and a third gate electrode 124c is formed on a first substrate 110, which may be made of a transparent glass or plastic.

The first substrate 110 may be made of a bendable material.

The gate line 121 is mainly extended in a horizontal direction and transmits a gate signal. The first gate electrode 124a and the second gate electrode 124b are protruded from the gate line 121 and are connected to each other. The first gate electrode 124a and the second gate electrode 124b are shown to be protruded downward from the gate line 121 on the plane in FIG. 3, but the present system and method are not restricted thereto. The first gate electrode 124a and the second gate electrode 124b may be protruded upward from the gate line 121 or may be provided on the gate line 121.

The first gate electrode 124a, the second gate electrode 124b, and the third gate electrode 124c are connected to the same gate line 121 and receive the same gate signal.

A storage electrode 131 may be further formed on the first substrate 110. The storage electrode 131 may be provided on edges of the two subpixels (PXa, PXb). The storage electrode 131 may be provided to surround the edge of the first subpixel (PXa) or may be provided at a lower edge of the second subpixel (PXb). The storage electrode 131, however, may be provided at various positions without being restricted to this. A constant voltage, such as a common voltage, is applied to the storage electrode 131.

A gate insulating layer 140 is formed on the gate line 121, the first gate electrode 124a, the second gate electrode 124b, the third gate electrode 124c, and the storage electrode 131. The gate insulating layer 140 may be formed with an inorganic insulating material such as a silicon nitride (SiNx) or a silicon oxide (SiOx). The gate insulating layer 140 may also be formed with a single layer or multilayers.

A first semiconductor 154a, a second semiconductor 154b, and a third semiconductor 154c are formed on the gate insulating layer 140. The first semiconductor 154a may be provided on the first gate electrode 124a, the second semiconductor 154b may be provided on the second gate electrode 124b, and the third semiconductor 154c may be provided on the third gate electrode 124c. The first semiconductor 154a, the second semiconductor 154b, and the third semiconductor 154c may be formed of amorphous silicon, polycrystalline silicon, or a metal oxide.

First ohmic contacts 163a and 165a may be formed on the first semiconductor 154a. Although not shown, second ohmic contacts may be formed on the second semiconductor 154b, and third ohmic contacts may be formed on the third semiconductor 154c. The first ohmic contacts 163a and 165a, the second ohmic contacts, and the third ohmic contacts may be made of a material such as a silicide or an n+ hydrogenated amorphous silicon with an n-type impurity doped at a high concentration.

A data metal layer including a reference voltage line 172, a data line 171, a first source electrode 173a, a first drain electrode 175a, a second source electrode 173b, a second drain electrode 175b, a third source electrode 173c, and a third drain electrode 175c are formed on the first ohmic contacts 163a and 165a, the second ohmic contacts, the third ohmic contacts, and the gate insulating layer 140.

The first semiconductor 154a, the second semiconductor 154b, the third semiconductor 154c, the first ohmic contacts 163a and 165a, the second ohmic contacts, and the third ohmic contacts may be formed using the same process used for forming the data line 171. Here, the first semiconductor 154a and the first ohmic contacts 163a and 165a are provided below the first source electrode 173a and the first drain electrode 175b, as shown in FIG. 4.

The reference voltage line 172 transmits a predetermined voltage, mainly extends in a horizontal direction and a vertical direction, and crosses the gate line 121. The reference voltage line 172 is provided in the subpixels (PXa, PXb). The reference voltage line 172 is formed to have a substantially S shape in the first subpixel (PXa) and is formed to have a substantially I shape in the second subpixel (PXb). The reference voltage line 172 extends in the horizontal direction at an upper edge, a lower edge, and a center portion of the first subpixel (PXa), and extends in the vertical direction at an upper portion of a left edge and a lower portion of a right edge of the first subpixel (PXa). The reference voltage line 172 extends in the vertical direction at a center portion of the second subpixel (PXb).

The same voltage as that applied to the storage electrode 131 or a different voltage may be applied to the reference voltage line 172. For example, the difference between the voltage applied to the reference voltage line 172 and the voltage applied to the storage electrode 131 may be about 3 volts.

The data line 171 transmits the data signal, mainly extends in the vertical direction, and crosses the gate line 121. The data line 171 is formed on the same layer as that of the reference voltage line 172.

The first source electrode 173a is protruded from the data line 171 and formed on the first gate electrode 124a. The first source electrode 173a may be bent to have a C shape on the first gate electrode 124a.

The first drain electrode 175a is formed on the first gate electrode 124a and separated from the first source electrode 173a. The first drain electrode 175a includes a wide end portion and a bar-type end portion. The bar-type end portion of the first drain electrode 175a is partly surrounded by the first source electrode 173a. A channel is formed in an exposed portion of the first semiconductor 154a between the first source electrode 173a and the first drain electrode 175a that are separated from each other.

The second source electrode 173b is protruded from the data line 171 and formed on the second gate electrode 124b. The second source electrode 173b may be bent to have a C shape on the second gate electrode 124b.

The second drain electrode 175b is formed on the second gate electrode 124b and separated from the second source electrode 173b. The second drain electrode 175b includes a wide end portion and a bar-type end portion. The bar-type end portion of the second drain electrode 175b is partly surrounded by the second source electrode 173b. A channel is formed on an exposed portion of the second semiconductor 154b between the second source electrode 173b and the second drain electrode 175b that are separated from each other.

The third source electrode 173c is connected to the second drain electrode 175b, particularly the wide end portion of the second drain electrode 175b, and provided on the third gate electrode 124c. The third source electrode 173c is formed to have a bar shape.

The third drain electrode 175c is separated from the third source electrode 173c on the third gate electrode 124c. A channel is formed on an exposed portion of the third semiconductor 154c between the third source electrode 173c and the third drain electrode 175c that are separated from each other.

The above-described first gate electrode 124a, the first semiconductor 154a, the first source electrode 173a, and the first drain electrode 175a form a first thin film transistor. The second gate electrode 124b, the second semiconductor 154b, the second source electrode 173b, and the second drain electrode 175b form a second thin film transistor. The third gate electrode 124c, the third semiconductor 154c, the third source electrode 173c, and the third drain electrode 175c form a third thin film transistor.

A first passivation layer 180p is formed on the data line 171, the first, second, and third source electrodes 173a, 173b, and 173c, and the first, second, and third drain electrodes 175a, 175b, and 175c. The first passivation layer 180p may be formed with an inorganic insulating material such as a silicon nitride (SiNx) or a silicon oxide (SiOx).

A second passivation layer 180q may be formed on the first passivation layer 180p. The second passivation layer 180q may be formed of a color filter. The color filter may express one of several primary colors such as red, green, and blue, or yellow, cyan, and magenta. The color filter may be further configured to express mixed colors of the primary colors, such as white. The second passivation layer 180q may be omitted in some cases. The color filter may be formed on the upper panel 200 rather than the lower panel 100 in some cases.

A first contact hole 185a and a second contact hole 185b for exposing part of the first drain electrode 175a and the second drain electrode 175b are formed in the first passivation layer 180p and the second passivation layer 180q. The first contact hole 185a exposes the wide end portion of the first drain electrode 175a, and the second contact hole 185b exposes the wide end portion of the second drain electrode 175b.

A pixel electrode 191 is formed on the second passivation layer 180q. The pixel electrode 191 may be formed with a transparent metal oxide such as indium-tin oxide (ITO) or indium-zinc oxide (IZO).

The pixel electrode 191 includes a first sub-pixel electrode 191a and a second sub-pixel electrode 191b. The first sub-pixel electrode 191a is formed on the first subpixel (PXa), and the second sub-pixel electrode 191b is formed on the second subpixel (PXb).

The first sub-pixel electrode 191a is connected to the first drain electrode 175a through the first contact hole 185a, and the second sub-pixel electrode 191b is connected to the second drain electrode 175b through the second contact hole 185b. Therefore, the first sub-pixel electrode 191a and the second sub-pixel electrode 191b receive the data voltage from the first drain electrode 175a and the second drain electrode 175b, respectively. Because the data voltage applied to the second drain electrode 175b is divided by the third source electrode 173c, the voltage applied to the second sub-pixel electrode 191b is less than the voltage applied to the first sub-pixel electrode 191a. That is, the first data voltage applied to the first sub-pixel electrode is greater than the second data voltage applied to the second sub-pixel electrode. The above comparison, however, corresponds to the case in which a positive (+) data voltage is applied to the first sub-pixel electrode 191a and the second sub-pixel electrode 191b. When a negative (−) data voltage is applied to the first sub-pixel electrode 191a and the second sub-pixel electrode 191b, the voltage applied to the first sub-pixel electrode 191a is less than the voltage applied to the second sub-pixel electrode 191b.

The area of the second sub-pixel electrode 191b may be greater than the area of the first sub-pixel electrode 191a and less than twice the area of the first sub-pixel electrode 191a. The first sub-pixel electrode 191a may neighbor the second sub-pixel electrode 191b with a gate line 121 therebetween.

The first sub-pixel electrode 191a has an overall quadrangle shape and includes T-shaped stems, which include a first horizontal stem 192a and a first vertical stem 193a, and one or more first fine branches 194a extending from the T-shaped stems 192a and 193a.

The first horizontal stem 192a substantially extends in the horizontal direction in parallel with the gate line 121. That is, the first horizontal stem 192a extends in a direction parallel to the direction along which a curvature is formed when the liquid crystal display according to an exemplary embodiment of the present system is used as a curved liquid crystal display.

The first vertical stem 193a substantially extends in the vertical direction in parallel with the data line 171. That is, the first vertical stem 193a extends perpendicularly to the direction along which a curvature is formed when the liquid crystal display according to an exemplary embodiment of the present system and method is used as a curved liquid crystal display. The first vertical stem 193a is connected to a first end of the first horizontal stem 192a.

The first fine branch 194a extends in an oblique direction with respect to the first horizontal stem 192a and the first vertical stem 193a. An angle between the first fine branch 194a and the first horizontal stem 192a is substantially 40 to 50 degrees. A plurality of first fine branches 194a extend from the first horizontal stem 192a and the first vertical stem 193a. Some first fine branches 194a of the plurality of first fine branches 194a are protruded upward with respect to the first horizontal stem 192a, while other first fine branches 194 are protruded downward with respect to the first horizontal stem 192a.

The first sub-pixel electrode 191a may include two first horizontal stems 192a and two first vertical stems 193a. The first sub-pixel electrode 191a may be divided into an upper portion and a lower portion that have the same area as each other. One of the two first horizontal stems 192a and one of the two first vertical stems 193a are provided on the upper portion of the first sub-pixel electrode 191a. The other of the first horizontal stems 192a, and the other of the two first vertical stems 193a are provided on the lower portion of the first sub-pixel electrode 191a. One of the two first vertical stems 193a is provided on a first edge of the first sub-pixel electrode 191a, and the other of the two first vertical stems 193a is provided on a second edge of the first sub-pixel electrode 191a. For example, one of the two first vertical stems 193a may be provided on a left edge of the first sub-pixel electrode 191a, and the other of the two first vertical stems 193a may be provided on a right edge of the first sub-pixel electrode 191a.

Although FIG. 3 shows that the first vertical stem 193a provided on the upper portion of the first sub-pixel electrode 191a is provided on the left edge of the first sub-pixel electrode 191a, and the first vertical stem 193a provided on the lower portion of the first sub-pixel electrode 191a is provided on the right edge of the first sub-pixel electrode 191a, the present system and method are not restricted thereto. The first vertical stem 193a provided on the upper portion of the first sub-pixel electrode 191a may be provided on the right edge of the first sub-pixel electrode 191a, and the first vertical stem 193a provided on the lower portion of the first sub-pixel electrode 191a may be provided on the left edge of the first sub-pixel electrode 191a.

A plurality of first fine branches 194a extend in four different directions from the T-shaped stems 192a and 193a. The first fine branches 194a may extend in a top right direction, a bottom right direction, a top left direction, and a bottom left direction from the T-shaped stems 192a and 193a. For example, they may extend in the top right direction and the bottom right direction from the T-shaped stems 192a and 193a provided on the upper portion of the first sub-pixel electrode 191a, and they may extend in the top left direction and the bottom left direction from the T-shaped stems 192a and 193a provided on the lower portion of the first sub-pixel electrode 191a. In this instance, one or more of the first fine branches 194a extending in the bottom right direction may be connected to the first fine branches 194a extending in the top left direction.

The first vertical stem 193a of the first sub-pixel electrode 191a may overlap the storage electrode 131, and a partial region of the first fine branches 194a of the first sub-pixel electrode 191a may overlap the storage electrode 131. A border region among the upper edge, the lower edge, the upper portion, and the lower portion of the first sub-pixel electrode 191a may overlap the storage electrode 131.

The second sub-pixel electrode 191b has an overall shape of a quadrangle and includes cross-shaped stems, which include a second horizontal stem 192b and a second vertical stem 193b, and one or more second fine branches 194b extending from the cross-shaped stems 192b and 193b.

The second horizontal stem 192b substantially extends in the horizontal in parallel with the gate line 121. That is, the second horizontal stem 192b extends in a direction parallel to the direction along which a curvature is formed when the liquid crystal display according to an exemplary embodiment of the present system and method are is used as a curved liquid crystal display.

The second vertical stem 193b substantially extends in the vertical direction in parallel with the data line 171. That is, the second vertical stem 193b extends perpendicularly to the direction along which a curvature is formed when the liquid crystal display according to an exemplary embodiment of the present system and method is used as a curved liquid crystal display. The second vertical stem 193b crosses a center portion of the second horizontal stem 192b. That is, the second horizontal stem 192b crosses the second vertical stem 193b on the center portion of the second sub-pixel electrode 191b.

The second fine branch 194b extends in an oblique direction with respect to the second horizontal stem 192b and the second vertical stem 193b. An angle between the second fine branch 194b and the second horizontal stem 192b is substantially 40 to 50 degrees. A plurality of second fine branches 194b extend from the second horizontal stem 192b and the second vertical stem 193b.

The second subpixel (PXb) is divided into four sub-regions by the second horizontal stem 192b and the second vertical stem 193b. The second fine branches 194b provided in the respective sub-regions extend in different directions. For example, the second fine branches 194b provided in a first sub-region may obliquely extend in the top left direction from the second horizontal stem 192b or the second vertical stem 193b, and those provided in a second sub-region may obliquely extend in the top right direction from the second horizontal stem 192b or the second vertical stem 193b. Furthermore, the second fine branches 194b provided in a third sub-region may extend in the bottom right direction from the second horizontal stem 192b or the second vertical stem 193b, and those provided in a fourth sub-region may obliquely extend in the bottom left direction from the second horizontal stem 192b or the second vertical stem 193b.

A shield electrode 273 may be formed on the second passivation layer 180q. The shield electrode 273 may be formed on the same layer as that of the pixel electrode 191. The shield electrode 273 may overlap the data line 171. A constant voltage, such as a common voltage, may be applied to the shield electrode 273.

A connecting electrode 275 for connecting neighboring shield electrodes 273 may be further formed and may be formed on the same layer as that of the pixel electrode 191. The connecting electrode 275 may have an extension in a middle portion.

The upper panel 200 is described below.

A light blocking member 220 is formed on a second substrate 210, which may be made of transparent glass or plastic.

The second substrate 210 may be made of a bendable material.

The light blocking member 220, also called a black matrix, prevents light leakage. The light blocking member 220 may overlap the gate line 121, the data line 171, and the first, second, and third thin film transistors. Although the light blocking member 220 is described above as being formed on the upper panel 200, the present system and method are not restricted to this. The light blocking member 220 may be formed on the lower panel 100.

An overcoat 250 may be formed on the light blocking member 220, and a common electrode 270 may be formed on the overcoat 250.

The liquid crystal layer 3 includes liquid crystal molecules having negative dielectric anisotropy. That is, the liquid crystal molecules may be aligned so that long axes thereof are perpendicular with respect to the planar surfaces of the two display panels 100 and 200 when no electric field is applied.

When a data voltage is applied to the first subpixel electrode 191a and the second subpixel electrode 191b, and a common voltage is applied to the common electrode 270 of the upper display panel 200, an electric field is generated between the two electrodes 191 and 270 to determine the alignment of the liquid crystal molecules in the liquid crystal layer 3. The luminance of light passing through the liquid crystal layer 3 along the alignment direction of the liquid crystal molecules determined as described above is thusly changed.

According to an exemplary embodiment of the present system and method, the first sub-pixel electrode of the liquid crystal display includes T-shaped stems, and the second sub-pixel electrode includes cross-shaped stems. The above exemplary embodiment differs from a Comparative Example 1 in which the first sub-pixel electrode and the second sub-pixel electrode are configured with cross-shaped stems and a Comparative Example 2 in which the first sub-pixel electrode and the second sub-pixel electrode are configured with T-shaped stems.

The lower panel may be misaligned from the upper panel when the flat liquid crystal display is formed and bent to realize a curved liquid crystal display. Regarding Comparative Example 1, the vertical stem moves because of the misalignment, thereby causing texturing in the low gray, which may be visible as a stain. Regarding Comparative Example 2, when the misalignment is generated, no stain is generated since the vertical stem is provided on the edge of the pixel area.

When a relatively low voltage is applied to express a low grey, the second sub-pixel electrode is not turned on, while the first sub-pixel electrode is turned on. Because the first sub-pixel electrode of the liquid crystal display according to an exemplary embodiment of the present system and method includes T-shaped stems, no stain occurs when it is used as a curved liquid crystal display.

Regarding transmittance, because further horizontal stems are included in the case of Comparative Example 2, and the horizontal stems reduce transmittance, the transmittance of Comparative Example 2 is less than the transmittance of Comparative Example 1.

Regarding the liquid crystal display according to an exemplary embodiment of the present system and method, because the second sub-pixel electrode has cross-shaped stems, it provides greater transmittance than Comparative Example 2 does.

Therefore, the liquid crystal display according to an exemplary embodiment of the present system and method prevents generation of low-gray stains and improves transmittance when it is used as a curved liquid crystal display.

While the present system and method have been described in connection with exemplary embodiments, the present system and method are not limited to the disclosed embodiments. On the contrary, the present system and method cover various modifications and equivalent arrangements included within the spirit and scope of the appended claims.

What is claimed is:

1. A liquid crystal display comprising:
a first substrate; and
a pixel electrode provided on the first substrate and including a first sub-pixel electrode and a second sub-pixel electrode configured to receive different voltages,
wherein the first sub-pixel electrode includes
a T-shaped stem including a first horizontal stem and a first vertical stem, and
a first fine branch extending from the T-shaped stem, and
the second sub-pixel electrode includes
a cross-shaped stem including a second horizontal stem and a second vertical stem, and
a second fine branch extending from the cross-shaped stem,
wherein the first sub-pixel electrode includes an upper portion and a lower portion that are equal in area,
the upper portion includes a first plurality of first fine branches extending in parallel with each other from the T-shaped stem in a first direction, and
the lower portion includes a second plurality of first fine branches extending in parallel with each other from the T-shaped stem in a second direction different from the first direction.

2. The liquid crystal display of claim 1, wherein
the first sub-pixel electrode is configured to receive a first data voltage, and the second sub-pixel electrode is configured to receive a second data voltage that is smaller than the first data voltage.

3. The liquid crystal display of claim 2, wherein
the first vertical stem is connected to a first end of the first horizontal stem.

4. The liquid crystal display of claim 3, wherein the first sub-pixel electrode includes two first horizontal stems and two first vertical stems.

5. The liquid crystal display of claim 4, wherein
one of the two first horizontal stems and one of the two first vertical stems are provided on the upper portion of the first sub-pixel electrode, and
the other of the two first horizontal stems and the other of the two first vertical stems are provided on the lower portion of the first sub-pixel electrode.

6. The liquid crystal display of claim 5, wherein
one of the two first vertical stems is provided on a first edge of the first sub-pixel electrode, and
the other of the two first vertical stems is provided on a second edge of the first sub-pixel electrode.

7. The liquid crystal display of claim 5, wherein
one of the two first vertical stems is provided on a left edge of the first sub-pixel electrode, and
the other of the two first vertical stems is provided on a right edge of the first sub-pixel electrode.

8. The liquid crystal display of claim 4, wherein
the first fine branches extend in four different directions from the T-shaped stem.

9. The liquid crystal display of claim 8, wherein
the first fine branches extend in a top right direction, a bottom right direction, a top left direction, and a bottom left direction from the T-shaped stem.

10. The liquid crystal display of claim 2, wherein
the second vertical stem crosses the second horizontal stem.

11. The liquid crystal display of claim 10, wherein
the second vertical stem crosses a center portion of the second horizontal stem.

12. The liquid crystal display of claim 10, wherein
the second horizontal stem crosses the second vertical stem on a center portion of the second sub-pixel electrode.

13. The liquid crystal display of claim 10, wherein
the second sub-pixel electrode includes a plurality of second fine branches, and
the plurality of second fine branches extend in four different directions from the cross-shaped stem.

14. The liquid crystal display of claim 13, wherein
the plurality of second fine branches extend in a top left direction, a top right direction, a bottom right direction, and a bottom left direction from the cross-shaped stem.

15. The liquid crystal display of claim 2, further comprising:
a gate line, a data line, and a reference voltage line provided on the first substrate;
a first thin film transistor and a second thin film transistor connected to the gate line and the data line; and
a third thin film transistor connected to the gate line, the reference voltage line, and the second thin film transistor.

16. The liquid crystal display of claim 1, wherein
the first substrate is made of a bendable material.

17. The liquid crystal display of claim 1, wherein the first direction and second direction are perpendicular with respect to each other.

* * * * *